Sept. 14, 1926.  
D. T. FRASER  
1,599,958
VEHICLE ILLUMINATING DEVICE
Filed Feb. 12, 1924
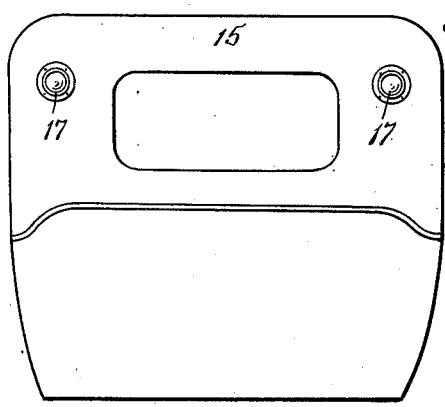
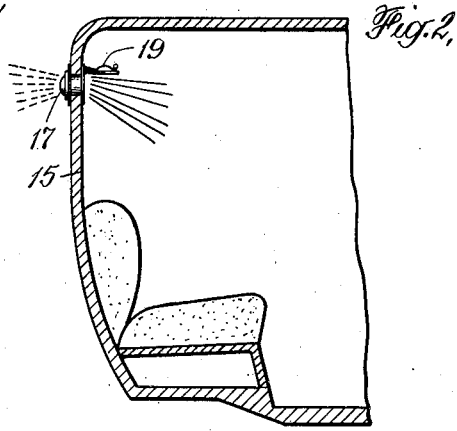
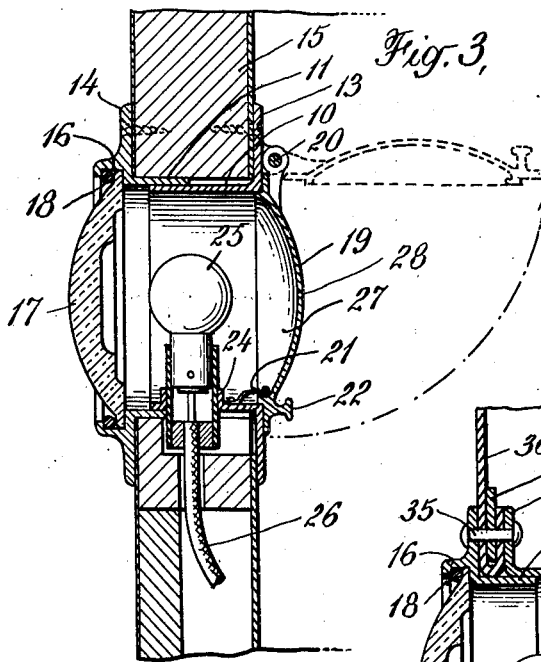
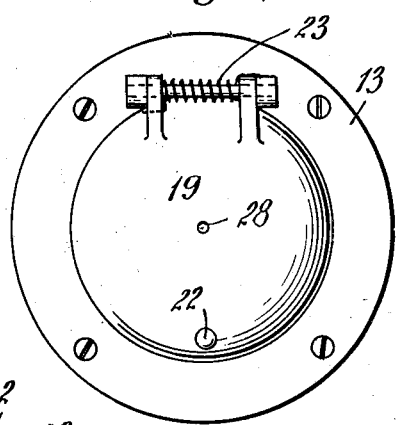
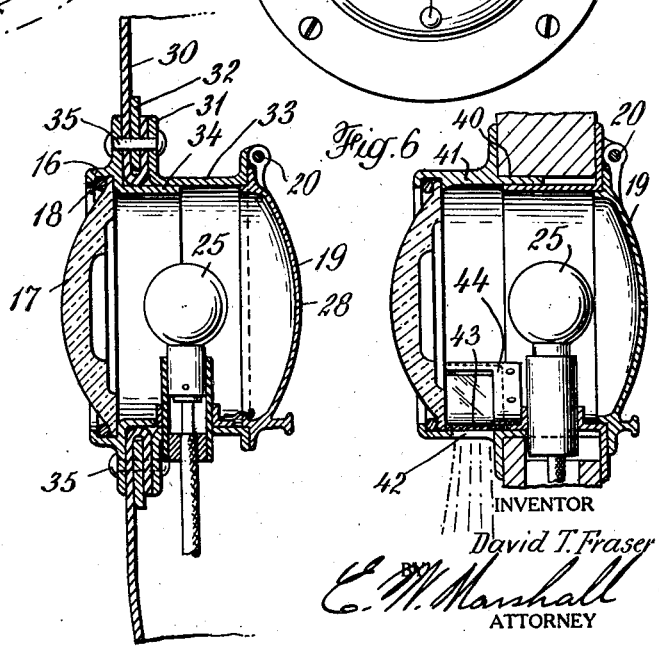
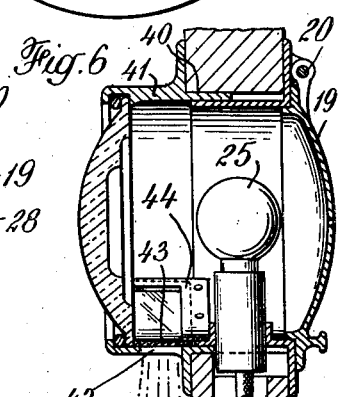
INVENTOR  
David T. Fraser  
BY  
ATTORNEY Patented Sept. 14, 1926.

1,599,958

UNITED STATES PATENT OFFICE.

DAVID T. FRASER, OF NEW YORK, N. Y.

VEHICLE ILLUMINATING DEVICE.

Application filed February 12, 1924. Serial No. 692,217.

This invention relates to illuminating devices and, particularly, to devices for illuminating motor vehicles.

As is well known, motor vehicles and, especially closed cars, are provided with dome lights or means for illuminating the interior of the vehicle. Also all motor vehicles must be provided with tail lights or signal lights visible from the rear of the vehicle.

This invention has for its salient object to provide an illuminating device for motor vehicles so constructed and arranged that a single lamp can be utilized to illuminate the interior of the vehicle and also serve as a signal light.

Another object of the invention is to provide a device of the character described so constructed and arranged that the lamp can be used solely as a signal light or to perform the function of a signal light and illuminating device for the interior of the vehicle.

Another object of the invention is to provide a device of the character described so constructed that it can be readily mounted on vehicle bodies of different dimensions.

Further objects of the invention will appear from the following specification taken in connection with the drawings, which form a part of this application, and in which—

Fig. 1 is a rear elevational view of a motor vehicle body having mounted thereon illuminating devices constructed in accordance with the invention.

Fig. 2 is a longitudinal sectional elevation of the rear portion of the vehicle body shown in Fig. 1, this section being taken through one of the lighting devices.

Fig. 3 is an enlarged sectional elevation showing the construction of the combination illuminating device.

Fig. 4 is an elevational view taken from the interior of the vehicle and showing the cover for the lamp casing closed.

Fig. 5 illustrates a modified form of the invention adapted for use on a touring or open car, and Fig. 6 illustrates a modified form of the structure shown in Figs. 1 to 4, the lower end of the casing being open or having a glass therein for permitting the rays of light to pass downwardly to illuminate a license plate.

The invention briefly described consists of a casing preferably formed in two parts and adapted to be mounted on the rear wall of a closed car and having means for supporting a lamp bulb therein. The rear wall of the casing is closed by a lens, preferably colored green or red, and the front end of the casing has a hinged cover thereon. The lamp illuminates the rear lens at all times and when it is desired to illuminate the interior of the vehicle, the cover is swung inwardly and upwardly, permitting the rays to illuminate the interior of the vehicle. Further details of the invention will appear from the following description.

Referring to the embodiment of the invention shown in Figs. 1 to 4, the lamp casing comprises a pair of casing members having tubular or cylindrical telescoping portions 10 and 11 and laterally extending flanges 13 and 14 formed thereon.

The flange 13 of the member 10 is secured to the inner wall of the rear end 15 of the vehicle body and the flange 14 is secured to the outer surface of the rear wall.

The rear portion of the casing has formed therein an annular groove 16 in which a tail light lens 17 is secured in any suitable manner as by a split ring 18.

A cover 19 is hinged at 20 to the flange 13 and a spring catch 21 is provided for securing the cover in closed position. The cover 19 has a knob 22 formed thereon or secured thereto for facilitating the opening of the cover. A spring 23 encircles the pivot pin 20 of the cover and normally retains the cover in closed position.

The sleeve or tubular member 10 has formed therein a boss 24 for receiving a lamp bulb 25, the lamp conduit being indicated at 26.

The illumination of the lamp bulb 25 will be controlled in the usual manner from the instrument board of the vehicle and when this bulb is lighted the lens 17 will be illuminated and if the cover 19 is swung to the dotted line position shown in Fig. 3, the interior of the vehicle will be illuminated. The inner surface 27 of the cover may be so constructed as to form a reflecting surface for the rays of light, if desired. In order to enable the operator to determine when the cover is closed whether the lamp 25 is lighted, the cover has a small opening or hole 28 therethrough.

Fig. 5 shows a modified form of the construction adapted for use on the rear curtain 30 of an open car and in this form of the invention, flanges 31 and 32 formed on the casings 33 and 34 are secured to the rear curtain in any suitable manner as by rivets 35. The tail light lens 17 is secured in the groove 16 formed in the rear portion of the casing member by a split ring 18 as in the other embodiment of the invention. The remaining structure shown in Fig. 5 is the same as that illustrated in Figs. 1 to 3 and, therefore, need not be specifically described.

In Fig. 6 the rear casing member 40 is extended as shown at 41 and the lower portion of this extension has formed therein a slot 42. A glass 43 closes this slot but permits the rays of light to pass therethrough downwardly to illuminate a license plate or to illuminate the rear end of the vehicle. The glass 43 is mounted in a casing 44 secured to the rear lamp casing member 40.

From the foregoing description it will be seen that a simple and practical illuminating device has been designed and that the lamp in this illuminating device will perform the double function of illuminating a signal lens and of illuminating the interior of a vehicle. In this way electrical energy will be conserved and a single lamp can be made to do double duty.

Although certain specific embodiments of the invention have been particularly shown and described, it will be understood that the invention is capable of modification and that changes in the construction and in the arrangement of the various cooperating parts may be made without departing from the spirit or scope of the invention, as expressed in the following claims.

What I claim is:

1. In combination, a vehicle body wall having an opening therethrough, a sectional lamp casing telescoped in said opening, a flange, on each section adapted to grip the wall therebetween when the sections are positioned, a reflecting cover provided with a peep hole, hinged exterior to the flange on one section, a light directing slot formed exterior to the flange in the other section, a signal lens supported at one end of the opening, and a light mounted in the casing 2. In combination, a vehicle body wall having an opening therethrough, a combined signal and tonneau light comprising a sectional lamp casing telescoped in said opening, a flange on each section adapted to grip the wall therebetween, when the sections are positioned, a reflecting cover provided with a peep hole, and hinged to one section exteriorly of the flange, means for retaining said cover in open and closed positions, a signal lens mounted in the other section exteriorly of the flange and a light mounted in the casing.

3. A combination illuminating device and signal lamp comprising a flanged lamp supporting section, a reflecting cover therefor hinged exteriorly to the flange, and provided with a peep hole, a second flanged section telescoping with said first section, a light directing slot in said last named section exterior to the flange thereof, said flanges adapted upon telescoping of the sections to grip a support.

In witness whereof, I have hereunto set my hand this 9th day of February, 1924.

DAVID T. FRASER.